(12) United States Patent
Murooka et al.

(10) Patent No.: US 7,330,434 B2
(45) Date of Patent: Feb. 12, 2008

(54) TRAFFIC QUALITY MEASUREMENT APPARATUS AND METHOD

(75) Inventors: Takahiro Murooka, Atsugi (JP); Masashi Hashimoto, Kamakura (JP); Toshiaki Miyazaki, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1015 days.

(21) Appl. No.: 10/424,748

(22) Filed: Apr. 29, 2003

(65) Prior Publication Data

US 2003/0202471 A1 Oct. 30, 2003

(30) Foreign Application Priority Data

Apr. 30, 2002 (JP) ............................. 2002-128916

(51) Int. Cl.
*H04L 12/26* (2006.01)
*G06F 15/173* (2006.01)

(52) U.S. Cl. .................. 370/235; 370/231; 370/252; 709/224

(58) Field of Classification Search ........ 370/229–235, 370/241, 246, 250, 252–253; 709/223–225
See application file for complete search history.

(56) References Cited

U.S. PATENT DOCUMENTS

| | | | | |
|---|---|---|---|---|
| 5,038,345 A | * | 8/1991 | Roth ........................... | 370/231 |
| 5,251,152 A | * | 10/1993 | Notess ........................ | 709/224 |
| 5,446,874 A | * | 8/1995 | Waclawsky et al. ........... | 714/1 |
| 5,867,483 A | * | 2/1999 | Ennis et al. ................. | 370/252 |
| 6,381,641 B1 | | 4/2002 | Iwasaki | |
| 6,421,319 B1 | * | 7/2002 | Iwasaki ...................... | 370/230 |

FOREIGN PATENT DOCUMENTS

| | | |
|---|---|---|
| JP | 5-37568 | 2/1993 |
| JP | 08-107421 | 4/1996 |
| JP | 09-055750 | 2/1997 |
| JP | 11-163929 | 6/1999 |
| JP | 2001-308858 | 11/2001 |
| JP | 2001-320374 | 11/2001 |

OTHER PUBLICATIONS http://www.neon.com/NetMinder_Ethernet.html, pp. 1/8-8/8, "Manage and Secure Your Network", Nov. 2002.
http://lastbit.com/trafmeter/default.asp, pp. 1/1-2/2, "TRAFMETER", 1997.
T. Oetiker, Swiss Federal Institute of Technology, pp. 1/10-10/10, "MRTG—The Multi Router Traffic Grapher", 1994.

(Continued)

*Primary Examiner*—Chi Pham
*Assistant Examiner*—Tri H. Phan
(74) *Attorney, Agent, or Firm*—Oblon, Spivak, McClelland, Maier & Neustadt, P.C.

(57) ABSTRACT

A measurement apparatus for measuring traffic of packets with high time resolution is provided. The measurement apparatus includes an accumulation part for accumulating packet lengths of packets having predetermined header information in successively received packets, and storing an accumulated value of the packet lengths in a storage; and a periodic reading part for reading the accumulated value from the storage at predetermined time intervals, and outputting the accumulated value.

18 Claims, 16 Drawing Sheets

OTHER PUBLICATIONS

Anritsu, pp. 1-19, "MD1230A Data Quality Analyzer", Aug. 2002.

K. Park, Proceedings of the 1997 Winter Simulation Conference, pp. 989-996, "On the Effect and Control of Self-Similar Network Traffic: A Simulation Perspective", 1997.

T. Murooka, et al., Proceedings of the 2003 IEICE General Conference, SB-4-1, pp. S-1 to S-2, "High Time-Resolution Real-Time Application Traffic Monitor", Mar. 3, 2003.

Hisaki Ohara, et al., "Development of Monitoring System to Measure Traffic and QoS of IP Network", NTT R&D, vol. 51, No. 2, 2002, pp. 48-58, (with partial English translation).

* cited by examiner

TRAFFIC QUALITY MEASUREMENT APPARATUS AND METHOD

BACKGROUND OF THE INVENTION

1. Field of the Invention

The present invention relates to a technique for measuring traffic of a packet-flow transmitted over a network for packet communication. More particularly, the present invention relates to a technique for measuring traffic at short time intervals so as to determine traffic quality accurately.

2. Description of the Related Art

As for a conventional traffic quality measurement apparatus targeted for packet communication, the purpose for using the apparatus is to measure traffic at the network level. Thus, the conventional traffic quality measurement apparatus mainly provides functions for measuring traffic volume over a long time period for a line as a whole, each protocol, each network layer and the like.

However, according to the above-mentioned conventional method, it is impossible to specify a packet-flow generated by a particular application using the network, to analyze the influence exerted on the packet-flow by the network, and to obtain traffic quality data necessary for adjusting the application to operate properly in the network.

That is, since the purpose of the conventional traffic quality measurement apparatus is to measure traffic over a long time period, time-resolution for measuring the traffic is more than one second. Therefore, traffic characteristics can not be obtained for a particular application such as a streaming service application.

Bandwidth required for the network for providing a streaming service including images and sound depends on its method of coding, and the bandwidth is discussed by using average bandwidth per second. However, software for sending coded data to the network performs its data sending processes independently of coding processes. In addition, the operation cycle of the software depends on the operation time unit of the task management system of the operating system on which the software is executed, and the operation cycle is generally from several milliseconds to several tens of milliseconds. That is, quality management for streaming traffic sent over the network requires measuring traffic-behavior with time-resolution higher than that of the conventional method.

SUMMARY OF THE INVENTION

An object of the present invention is to provide a technique that enables measuring traffic with high time-resolution.

The above object can be achieved by a measurement apparatus for measuring traffic of packets transmitted over a network, the measurement apparatus including:

an accumulation part for accumulating packet lengths of packets having predetermined header information in successively received packets, and storing an accumulated value of the packet lengths in a storage; and a periodic reading part for reading the accumulated value from the storage at predetermined time intervals, and outputting the accumulated value.

According to the present invention, since the accumulated value is stored and the accumulated value is read at predetermined time intervals, by using a short time interval (no more than one second) as the predetermined time interval, traffic can be measured with high time-resolution and in real time. On the other hand, according to the conventional technology, since a large amount of packet data needs to be stored in a measurement apparatus for processing, the traffic can not be measured with high time-resolution and in real time.

The measurement apparatus of the present invention initializes an area storing the accumulated value in the storage every time the accumulated value is read from the storage. Thus, operation of subtraction is unnecessary so that high-speed processing can be realized.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
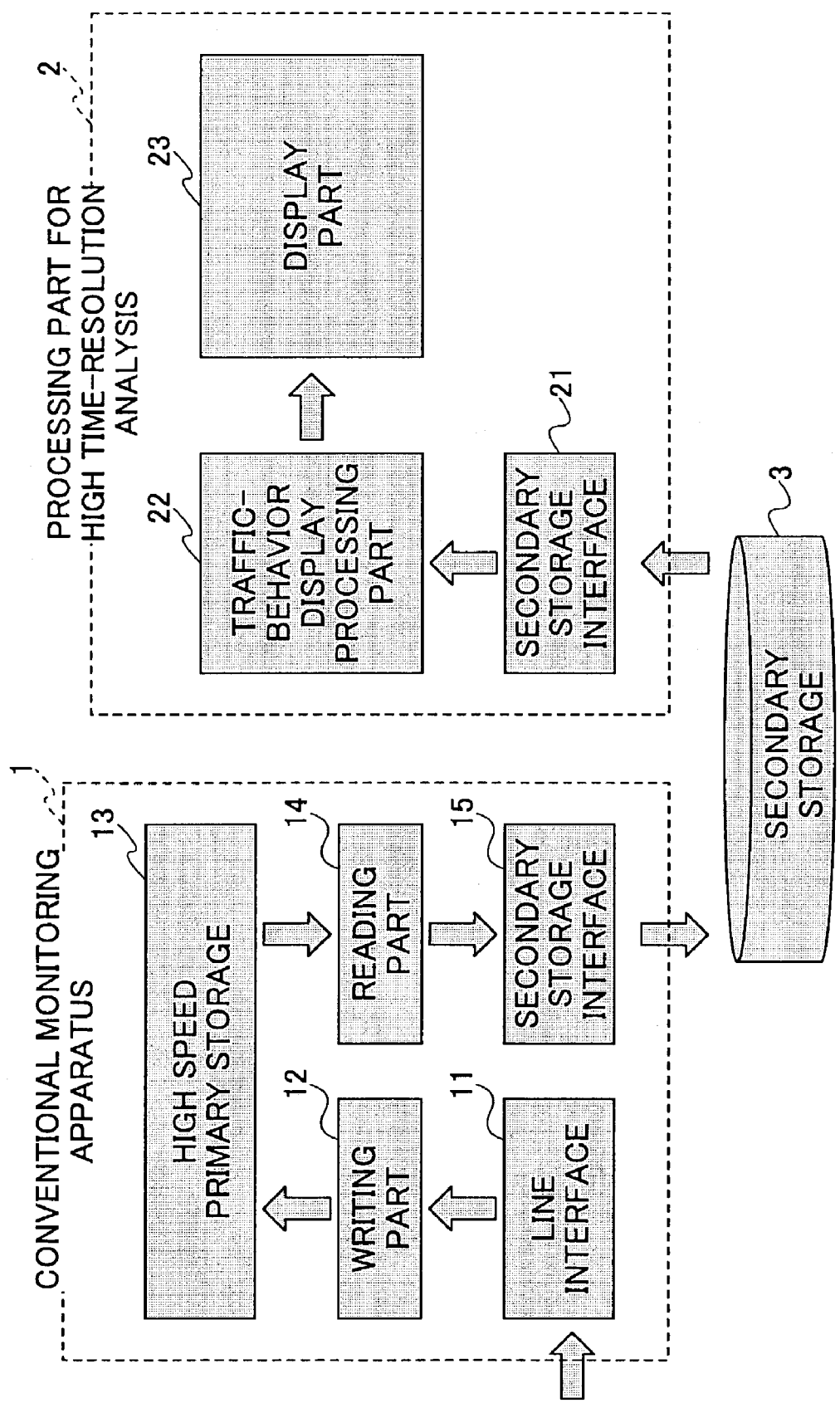
FIG. 1 shows a configuration of a hypothetical apparatus using a conventional traffic monitor apparatus.

In the following, embodiments of the present invention will be described. One embodiment of the present invention is a traffic quality measurement apparatus that can measure traffic of a packet-flow at time intervals no more than one second. Before the traffic quality measurement apparatus will be described, the reason for using the time interval will be described. The time interval is no more than one second. More particularly, the time interval is from 10 μ second to one second.

An application that transmits moving images and sound in real time requires a time constraint of no more than one second, different from general applications in which time-out is determined in seconds.

For example, as for real-time transmission of moving images using the NTSC television signal, about 30 screens are transmitted in one second so as to be displayed. Therefore, transmitting time permitted for one screen is no more than 30 milliseconds. In addition, if the receiver cannot receive the screens at evenly spaced periods of 30 milliseconds, the application in the receiver cannot properly display the moving images. In order to measure traffic of packets including image data sent at intervals of 30 milliseconds, time accuracy of at least one millisecond is required. Considering a wideband network line that will emerge in the near future, measurement at time intervals shorter than that used in the conventional apparatus will be required.

In addition, for developing the application, it is necessary to grasp bandwidth of the network over which the application transmits data. Since a very high speed MPU is becoming widespread, there is a high probability that the developed application will transmit burst packet data that the developer of the application cannot predict.

A part of packets included in the burst packet data that exceeds acceptable burst level for the network may overflow a buffer of a node apparatus of the network, so that packet loss occurs. At this time, retransmission of the packets is performed by using a function of the OS on which the application operates. However, if the burst packets are transmitted again, the same phenomenon is repeated, so that time constraint for realizing real-time data streaming cannot be satisfied for the application.

To avoid the above-mentioned problem, it is indispensable for the application developer to measure traffic of packets at minute intervals so as to design an application having high network transparency.

Conventionally, the purpose for measuring traffic is to monitor traffic-behavior over a long period, and the time interval at which traffic is measured is longer than one second. As mentioned above, it is conventionally impossible to determine burst characteristics of the packet-flow specific for the streaming service application.

For measuring traffic at short time intervals, a method using a conventional traffic monitor apparatus can be considered, in which the traffic monitor apparatus captures all communication data by using a data capturing function, and processes the captured data.

FIG. 1 shows a configuration of a hypothetical apparatus using the conventional traffic monitor apparatus for performing the above-mentioned method.

This apparatus includes the conventional traffic monitor apparatus 1, a processing part 2 for displaying data of high time-resolution, and a secondary storage 3 for storing captured packets. In the conventional traffic monitor apparatus 1, packets received from a line for a time period are temporarily stored in a high speed primary storage 13 via a line interface part 11 and a writing part 12. Then, the packets are output to the secondary storage 3 via a reading part 14 and a secondary storage interface 15. After that, as off-line processing, the processing part 2 reads and analyzes the packets stored in the secondary storage 3 and displays traffic transition information on a display part 23.

By this hypothetical apparatus, the time period during which the traffic can be observed at one time depends on the capacity of the primary storage 13. For example, as for packets transmitted at near 1 Gbps, the time is less than several seconds. In addition, since the captured packet data are passed between a plurality of storage devices, it is impossible to continuously measure traffic in real time.

In the following, an embodiment of the present invention will be described.

Figure 2:
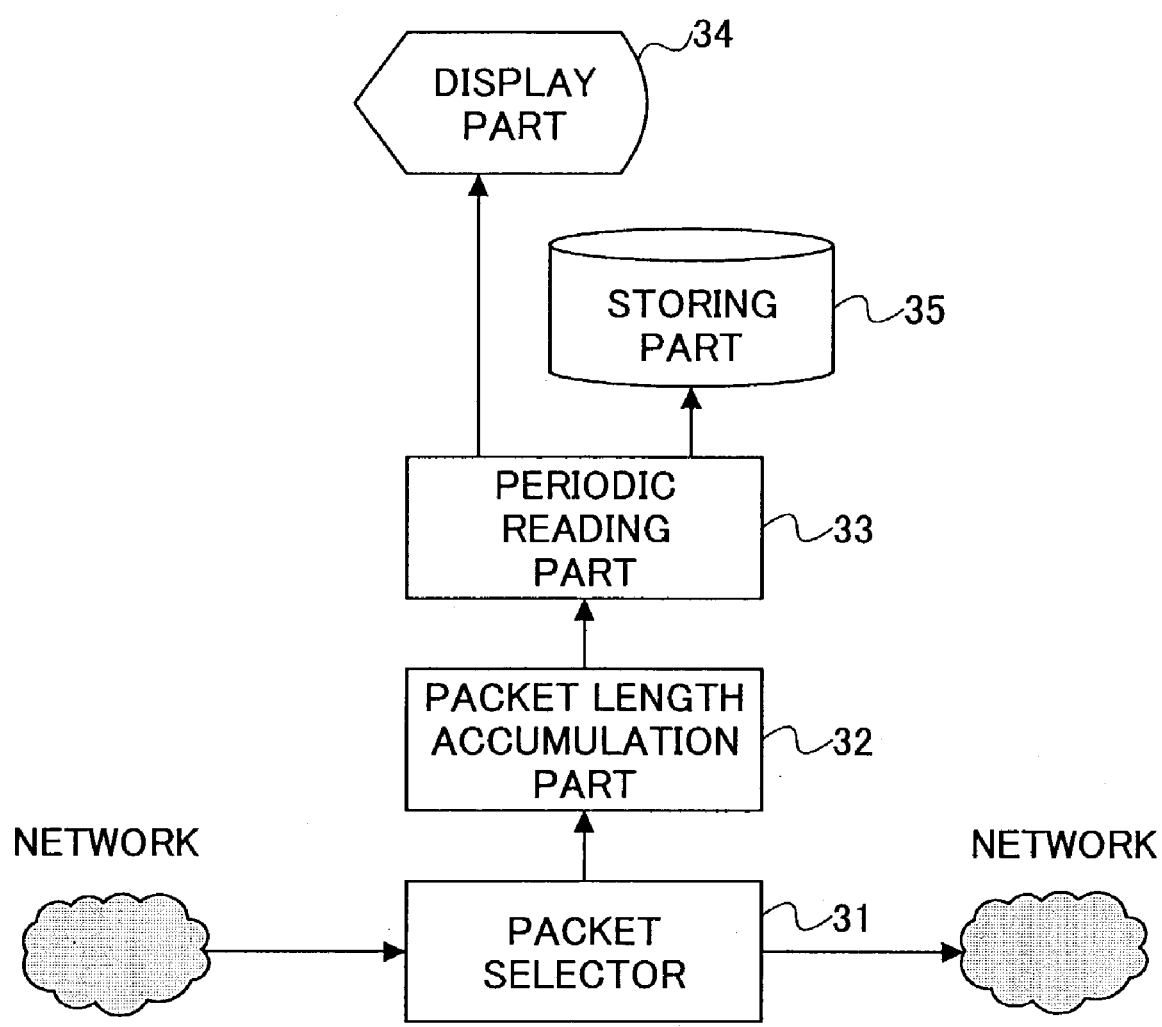
FIG. 2 is a figure showing a schematic block diagram of a traffic quality measurement apparatus according to an embodiment of the present invention.

FIG. 2 is a figure showing a schematic block diagram of a traffic quality measurement apparatus according to an embodiment of the present invention. The traffic quality measurement apparatus includes a packet selector 31, a packet length accumulation part 32, a periodic reading part 33, a display part and a storing part 35.

The packet selector 31 extracts a particular packet-flow from many packet-flows on a network. The packet length accumulation part 32 accumulates packet lengths of the extracted packets. The periodic reading part 33 reads the accumulated value of the packet lengths periodically at predetermined time intervals and displays or stores the accumulated value. In the following, the operation of the traffic quality measurement apparatus will be described.

A packet selected by the packet selector 31 is replicated and is input to the packet length accumulation part 32. The packet length accumulation part 32 accumulates packet lengths of each packet by using a counter associated with the header of the packet, and stores the accumulated value in a memory of the packet length accumulation part 32. The processes described so far are performed each time a targeted packet arrives. That is, the packet selector 31 and the packet length accumulation part 32 perform processes in synchronization with the arrival of each packet.

Figure 3:
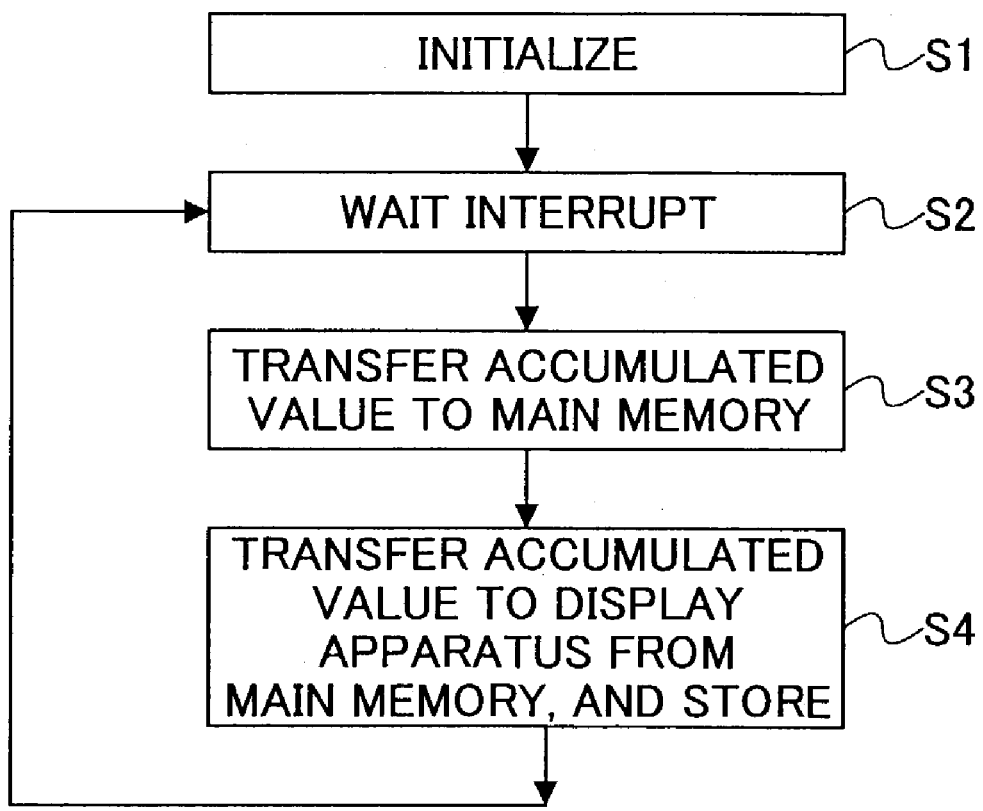
FIG. 3 is a figure for explaining the operation of the periodic reading part 33 in the traffic quality measurement apparatus shown in FIG. 2.

The operation of the periodic reading part 33 will be described with reference to FIG. 3. After initialization (step S1), the periodic reading part 33 enters an interrupt waiting state in step S2. When an interrupt occurs, which occurs every constant time period (one millisecond), the periodic reading part 33 reads the accumulated value stored in the memory in the packet length accumulation part 32. Then, the periodic reading part 33 transfers the accumulated value to a main memory in the periodic reading part 33, and in addition, initializes the value stored in the memory in the packet length accumulation part 32 in step S3 After that, the periodic reading part 33 sends the accumulated value from the main memory to the display part 34, and stores the accumulated value in the storing part 35 as a file in step S4. The display part 34, for example, displays a graph of transition of traffic for a particular kind of packet in which the horizontal axis indicates time and the vertical axis indicates the accumulated value. In addition, the display part 34 or other part can process the accumulated value such that burst characteristic evaluation can be easily performed, and the display part 34 can display the processed data As shown in FIG. 4, instead of displaying the accumulated value on the display part 34 or storing it in the storing part 35, the periodic reading part 33 may send the accumulated value to a remote monitoring apparatus and the like via a network 40, so that the remote monitoring apparatus displays traffic-behavior.

Figure 4:
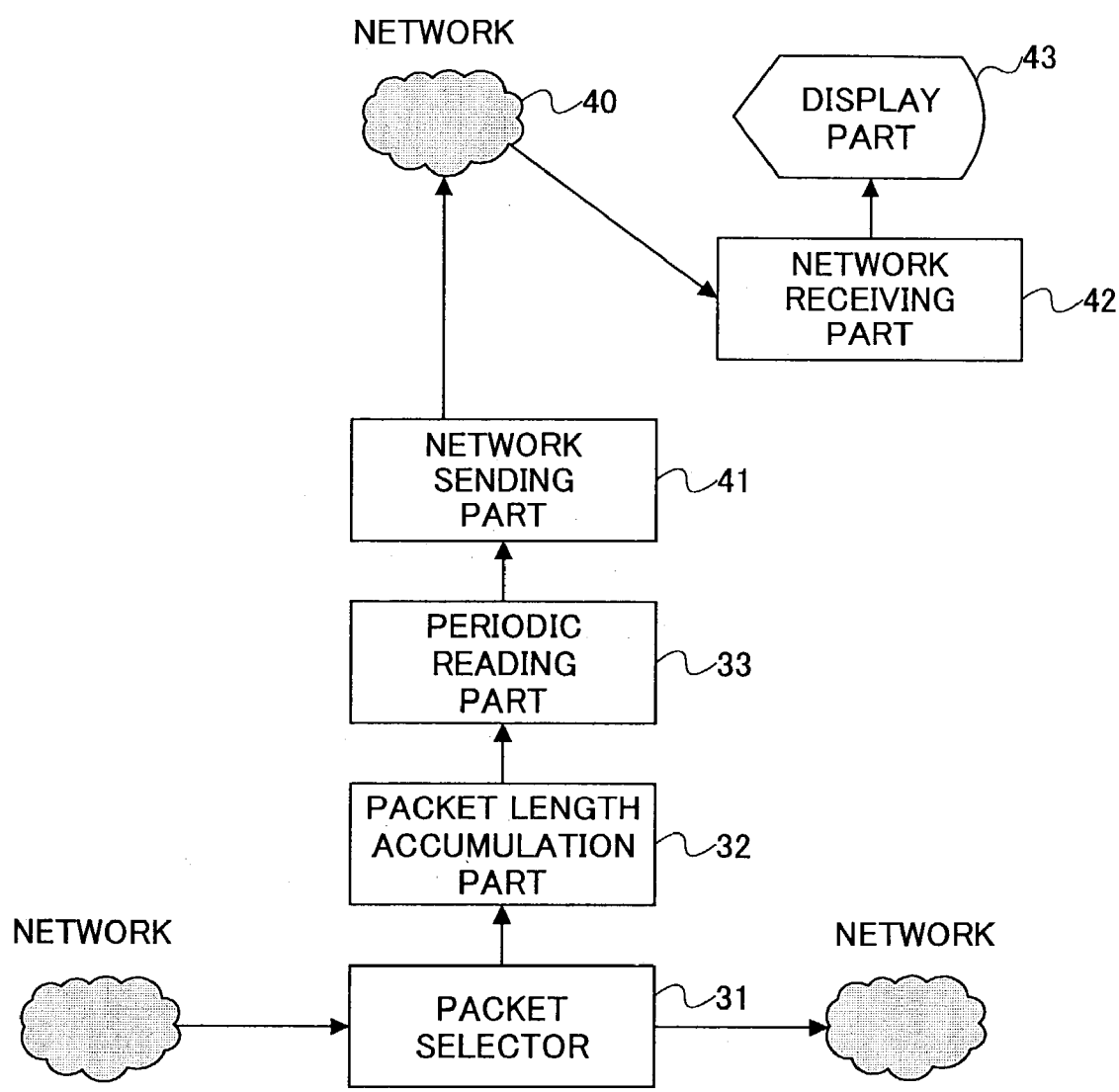
FIG. 4 is a figure showing a schematic block diagram of a traffic quality measurement apparatus according to an embodiment of the present invention in the case when the measurement data are sent over the network.

That is, the configuration shown in FIG. 4 includes a network sending part 41 instead of the display part 34 and storing part 35. The network sending part 41 is connected to a network receiving part 42 and a display part 43 in the remote monitoring apparatus via the network 40.

Figure 5:
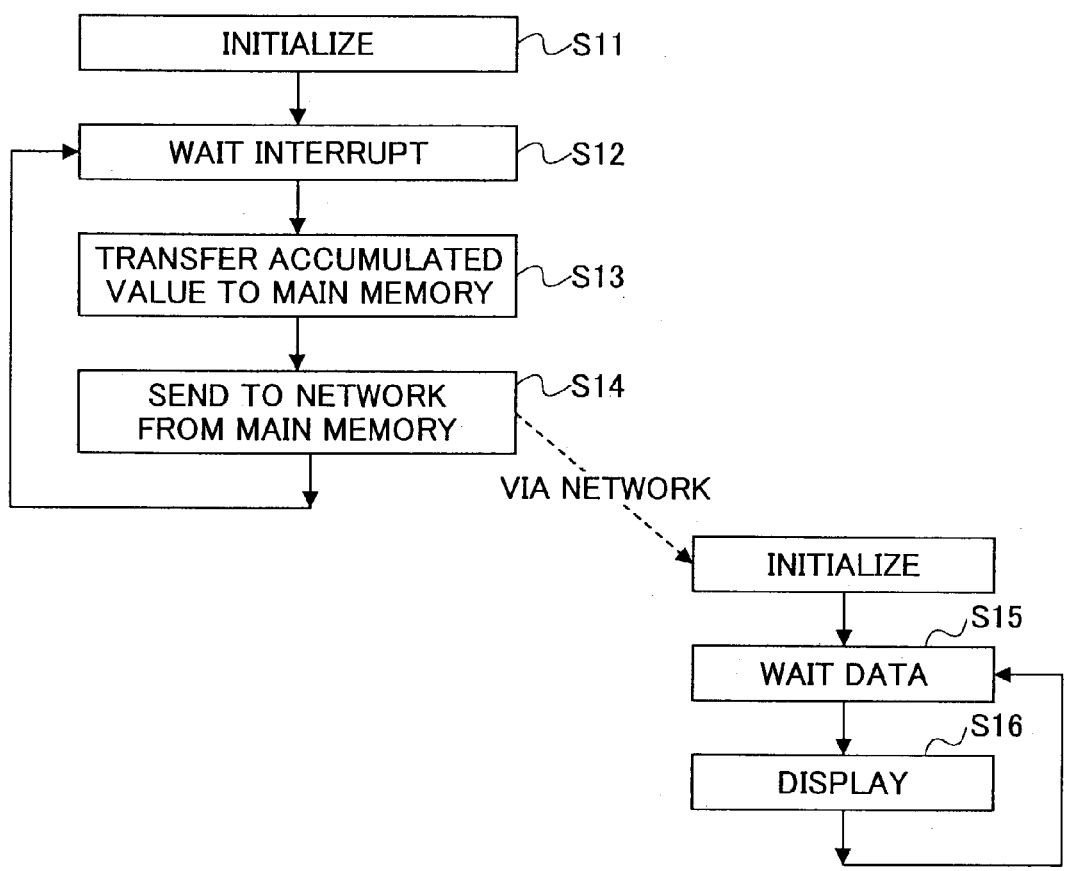
FIG. 5 is a figure for explaining the operation of the periodic reading part 33 in the traffic quality measurement apparatus shown in FIG. 4.

As shown in a flowchart in FIG. 5, in this case, the periodic reading part 33 sends the accumulated value to the network 40 via the network sending part 41 in step S14. On the receiving side, the remote monitoring apparatus waits for data to be displayed, and when the network receiving part 42 receives the accumulated value in step S15, the display part 43 displays the accumulated value in step S16 The periodic reading part 33 may process the accumulated value such that burst characteristic evaluation can be performed easily, and processed data can be sent over the network 40.

Figure 6:
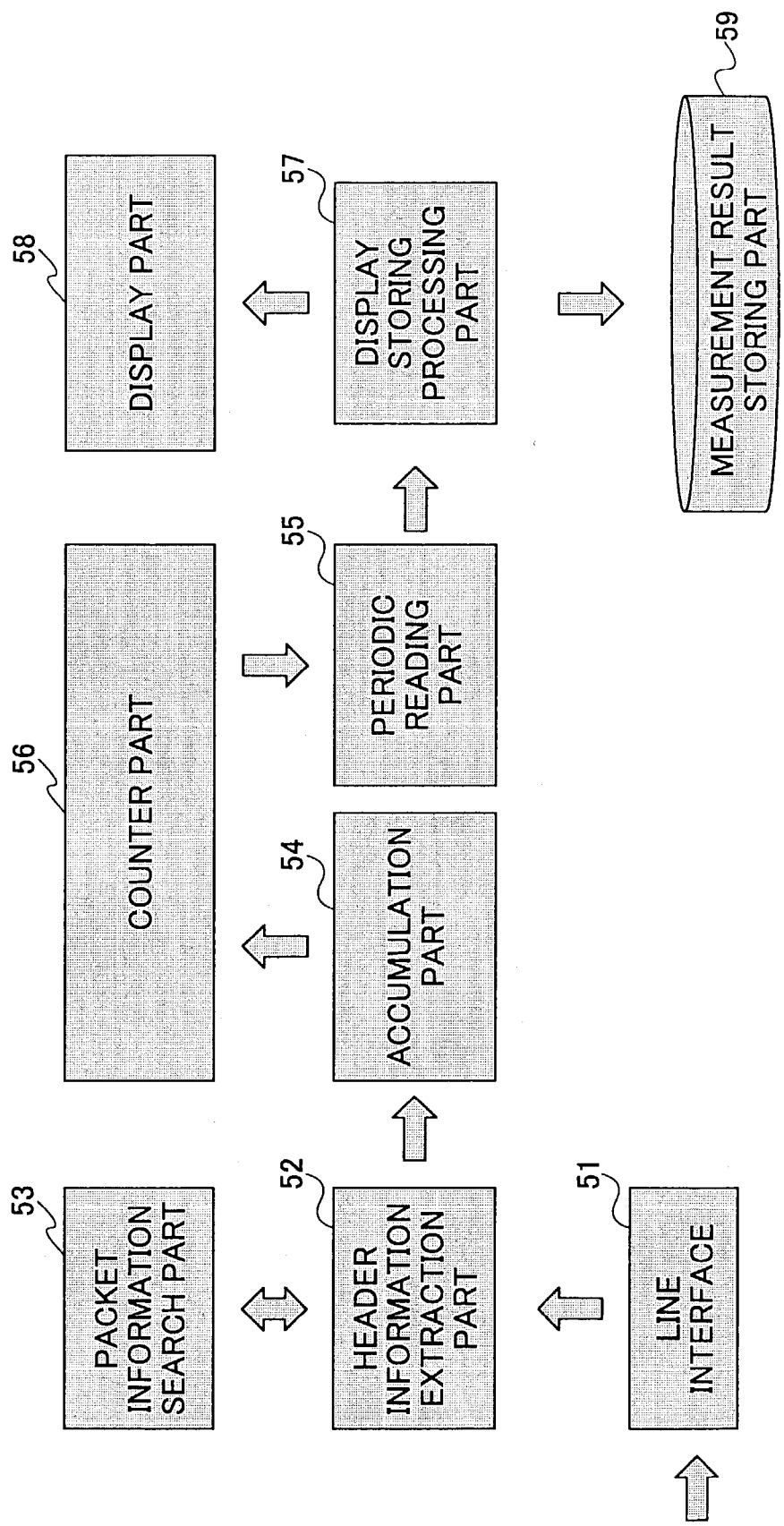
FIG. 6 shows function blocks of the traffic quality measurement apparatus in this embodiment of the present invention.

More specifically, the traffic quality measurement apparatus in this embodiment includes function blocks as shown in FIG. 6. A line interface 51, a header information extraction part 52 and a packet information search part 53 shown in FIG. 6 correspond to the packet selector 31, an accumulation part 54 and a counter 56 correspond to the packet length accumulation part 32, and a periodic reading part 55 corresponds to the periodic reading part 33. The operation of the configuration shown in FIG. 6 is as follows.

A packet received via the line interface 51 is input to the header information extraction part 52, so that header information is extracted from the received packet. The packet information search part 53 searches the counter part 56 for an identifier of a counter corresponding to the header information. If the identifier is retrieved, the header information extraction part 52 passes the packet length of the packet and the identifier to the accumulation part 54. The accumulation part 54 accumulates the packet length to an already accumulated value by using the counter corresponding to the identifier. Processes so far are performed according to arrival of each packet.

Data in the counter of the counter part 56 are read by the periodic reading part 55 at regular time intervals, and the counter is reset each time the data are read. The time interval for reading data is a time (for example, one millisecond) by which behavior of an application can be properly observed. The value of the counter is displayed via a display/storing processing part 57 and is stored in the result storing part 59.

Next, an example of a method for measuring traffic quality by using the traffic quality measurement apparatus of this embodiment will be described.

Figure 7:
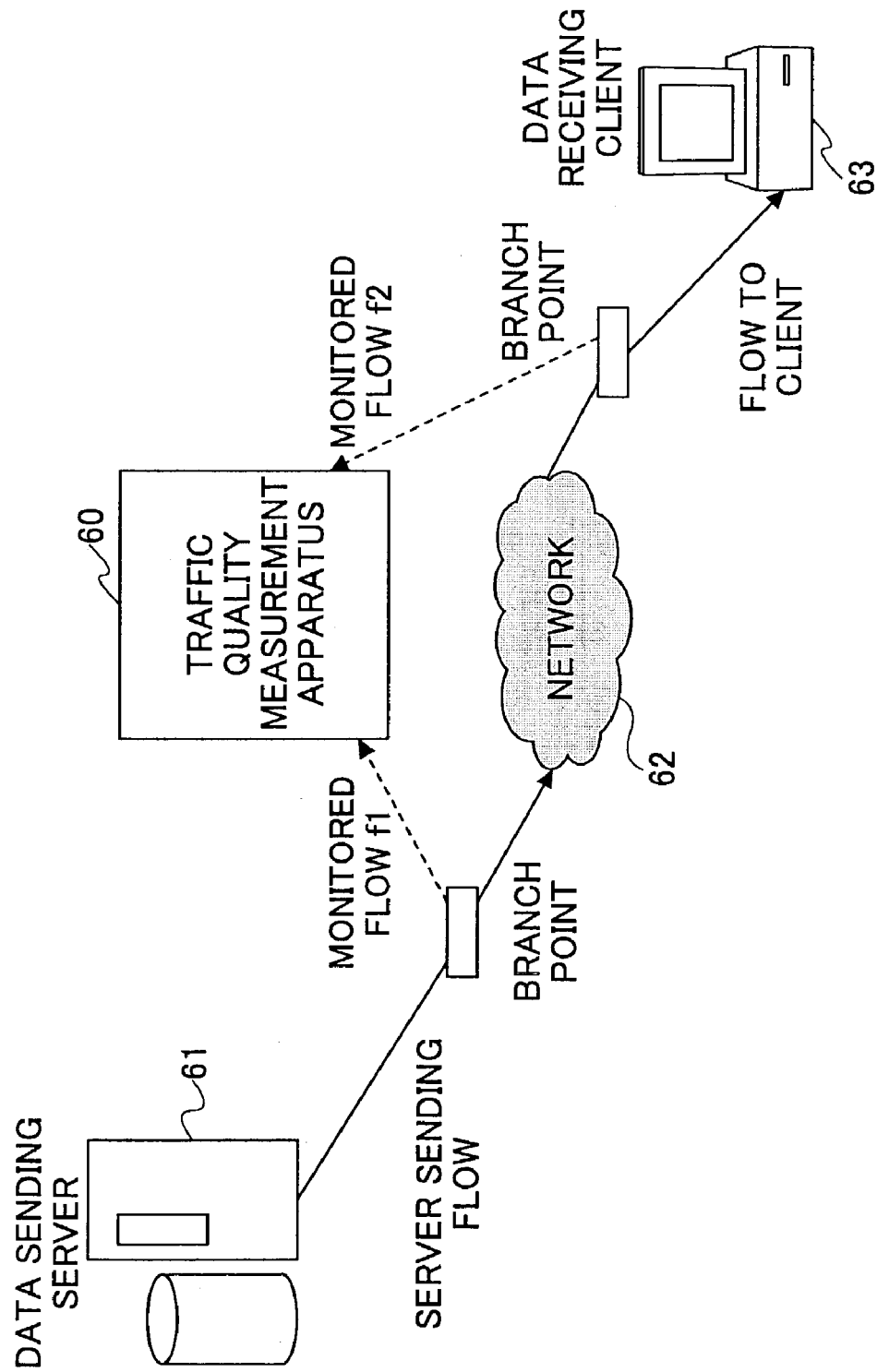
FIG. 7 shows a configuration example for measuring the traffic quality by using the traffic quality measurement apparatus according to this embodiment of the present invention.

FIG. 7 shows a configuration example for measuring the traffic quality by using the traffic quality measurement apparatus 60. In this configuration, the traffic quality measurement apparatus 60 measures a packet-flow f1 just after the packet-flow f1 is sent from a data sending server 61 and measures a packet-flow f2 that has been transmitted over the network 62 and just before the packet-flow f2 is received by a data receiving client 63, and compares measurement results of the packet-flows f1 and f2. By obtaining and evaluating differences of burst characteristics between the entrance and the exit of the network, influence exerted by the network 62 on the burst characteristics of the packet-flow sent from the data sending server 61 can be observed. The packet-flow f1 just after being sent from the data sending server 61 can be considered to be a packet-flow specific for an application in a network of an ideal state in which any packet-flow other than the subject packet-flow does not exist.

In this configuration, the application of the data sending server 61 adds tag information necessary for identifying burst traffic to each packet, and outputs the packet and the tag information to the network 62. A packet used for traffic measurement may be simultaneously sent to the network to the extent that the packet does not affect the application traffic.

The change of the burst characteristics can be observed by comparing traffic-behavior obtained at the entrance of the network and traffic-behavior obtained at the exit of the network, by showing the traffic-behavior in a graph in which the horizontal axis indicates time and the vertical axis indicates the accumulated value.

The change of the burst characteristics can be also observed by obtaining, from the accumulated value, throughput (mean value of traffic volume per a unit time) of a burst transfer part of the packets and burst transfer interval time, which is an interval at which the burst transfer part appears.

Figure 8:
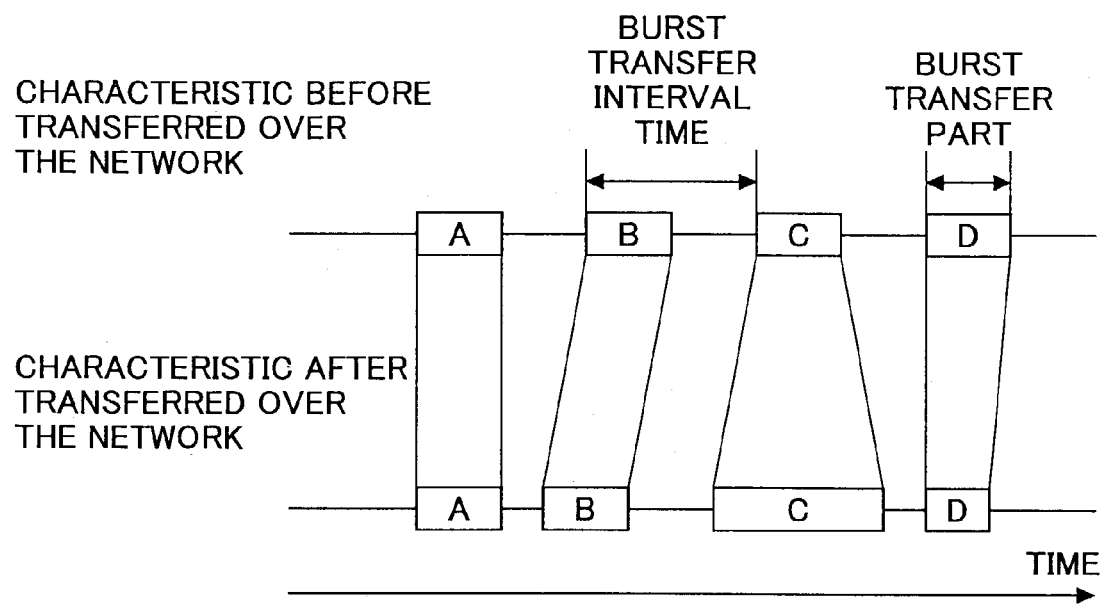
FIG. 8 shows an example of states of a packet-flow before and after being transmitted over the network.

FIG. 8 shows an example of states of a packet-flow before and after being transmitted over the network. Each packet of each burst transfer part includes tag information by which the burst transfer part is identified. Following is another method for identifying the burst transfer part. That is, when traffic greater than a threshold continues for a predetermined time, the packets of the traffic can be identified to be the burst transfer part.

Figure 9:
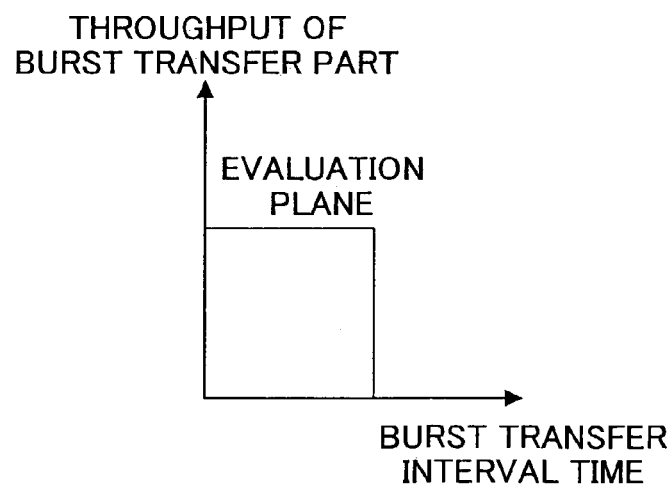
FIG. 9 shows an example of an evaluation method in the case where the throughput of the packet transfer part and the burst transfer interval time are used.

FIG. 9 shows an example of an evaluation method in the case where the throughput of the packet transfer part and the burst transfer interval time are used. A characteristic diagram (evaluation plane) is obtained by plotting obtained values on a two dimensional plane in which the vertical axis indicates the throughput and the horizontal axis indicates the burst transfer interval time. By obtaining such evaluation planes at the entrance and the exit of the network, influence exerted on the application by the network can be obtained.

Figure 10:
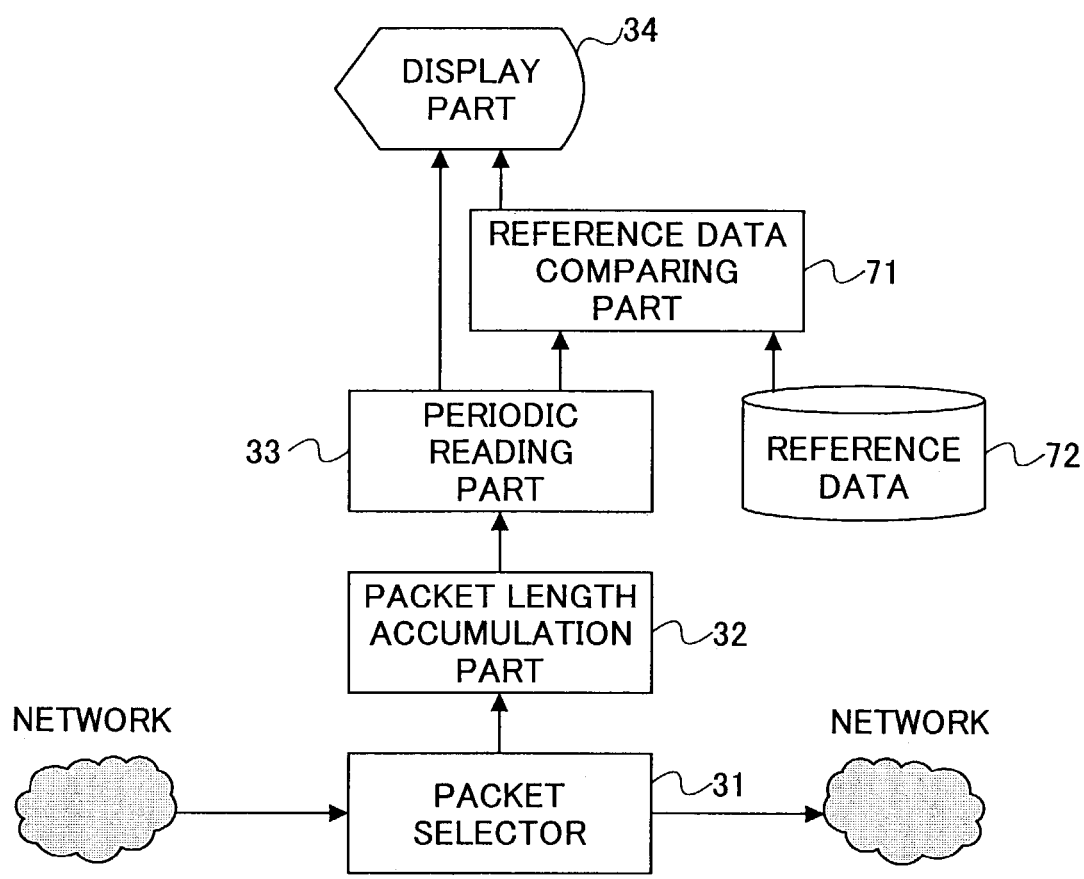
FIG. 10 is a figure showing a schematic block diagram of a traffic quality measurement apparatus according to an embodiment of the present invention in the case when the reference data comparing part is provided.

For comparing traffic characteristics before and after the packets are transmitted over the network so as to evaluate the network, the traffic quality measurement apparatus can be configured as shown in FIG. 10. That is, a reference data comparing part 71 and a reference data storing part 72 are added to the configuration shown in FIG. 2. The reference data storing part 72 stores, as reference data, burst characteristics of a packet-flow specific for the application in an ideal network in which any packet-flow other than the subject packet-flow does not exist. For example, the reference data can be obtained by measuring the packet-flow f1 shown in FIG. 7.

The reference data comparing part 71 compares burst characteristics of a packet-flow obtained by using the periodic reading part 33 with the reference data stored in the reference data storing part 72. In this case, the display part 34 can display output data of the periodic reading part 33 and can display output data of the reference data comparing part 71. The burst characteristics used for comparison may be either the transition of traffic or the result obtained by the method shown in FIG. 9.

In the following, a more detailed configuration of the traffic quality measurement apparatus will be described with reference to FIG. 11. The configuration shown in FIG. 11 is close to actual hardware implementation of the traffic quality measurement apparatus according to the present invention.

Figure 11:
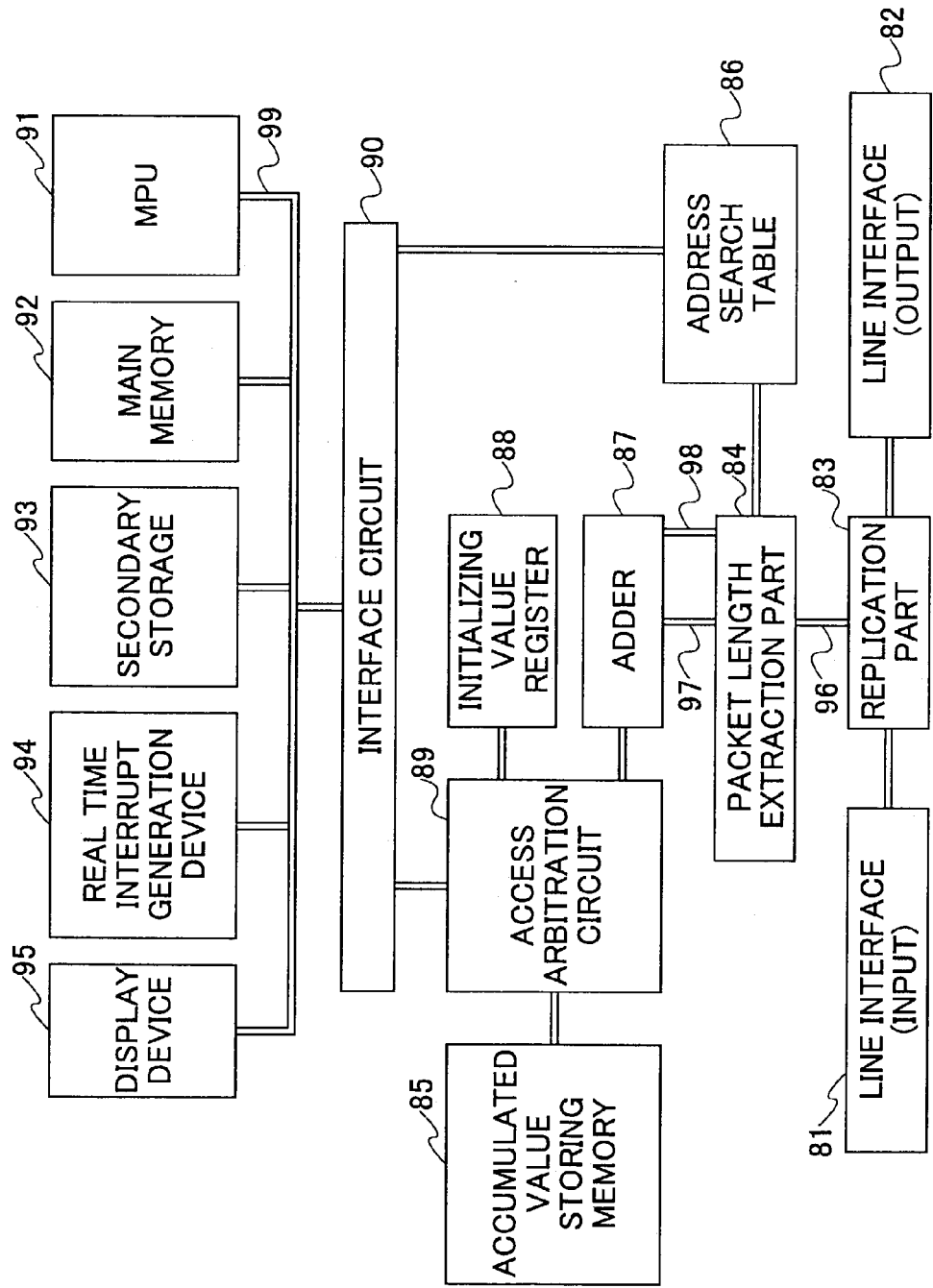
FIG. 11 shows a detailed configuration of the traffic quality measurement apparatus according to an embodiment of the present invention.

As shown in FIG. 11, the traffic quality measurement apparatus includes a line interface 81 of the input side, a line interface 82 of the output side, a replication part 83, a packet length extraction part 84, an accumulated value storing memory 85, an address search table 86, an adder 87, an initializing value register 88, an access arbitration circuit 89, an interface circuit 90, a MPU 91, a main memory 92, a secondary storage 93, a real time interrupt generation device 94, and a display device 95. The line interfaces 81 and 82, the replication device 83, and the packet length extraction part 84 correspond to the packet selector 31 shown in FIG. 10, for example. The accumulated value storing memory 85, the address search table 86, the adder 87, the initializing value register 88 and the access arbitration circuit 89 correspond to the packet length accumulation part 32. The main memory 92 or the secondary storage 93 corresponds to the reference data storing part 72. The MPU 91, the main memory 92, the real time interrupt generation device 94 and a program stored in the main memory 92 correspond to the periodic reading part 33 and the reference data comparing part 71. In addition, the display apparatus 95 corresponds to the display part 34. In the following, the function of each part shown in FIG. 11 will be described.

The replication part 83 replicates the packet. The packet length extraction part 84 extracts a specific packet from the replicated packets, and calculates the length of the specific packet. The accumulated value storing memory 85 stores an accumulated value of the packet lengths in an address corresponding to the header information of the packet. The address search table 86 is searched for an address of the accumulated value storing memory 85 at which the accumulated value is stored by using the header information, and the address is returned to the packet length extraction part 84.

The adder 87 adds the packet length obtained by the packet length extraction part 84 to the already accumulated value stored in the address of the accumulated value storing memory 85. The initializing value register 88 stores an initialization value used for initializing the accumulated value storing memory 85. The access arbitration circuit 89 arbitrates between accesses to the accumulated value storing memory 85.

In FIG. 11, 96 indicates a replicated packet-flow, 97 indicates the obtained packet length, 98 indicates the address of the accumulated value storing memory 85 obtained from the address search table 86, and 99 indicates a bus that connects the interface circuit 90, the MPU 91, the main memory 92, the secondary storage 93, the real time interrupt generation circuit 94 and the display apparatus 95. The bus 99 is indispensable for the MPU 91 to perform its processes.

Next, the operation of the apparatus will be described, in which detailed configuration of the apparatus will be also described.

The line interface 81 connects to a line (network), and converts a packet that is received as a physical signal from the line into a packet signal that can be logically processed, and transfers the packet signal to the replication part 83. The replication part 83 fully replicates the packet signal into two packet signals. The replication part 83 outputs one packet signal to the line interface 82 and another packet signal to the packet length extraction part 84. The line interface 82 performs a process that is the reverse of that of the line interface 81 on the packet signal, and outputs the packet to the line.

The packet (96) replicated in the replication part 83 is passed to the packet length extraction part 84.

Figure 12:
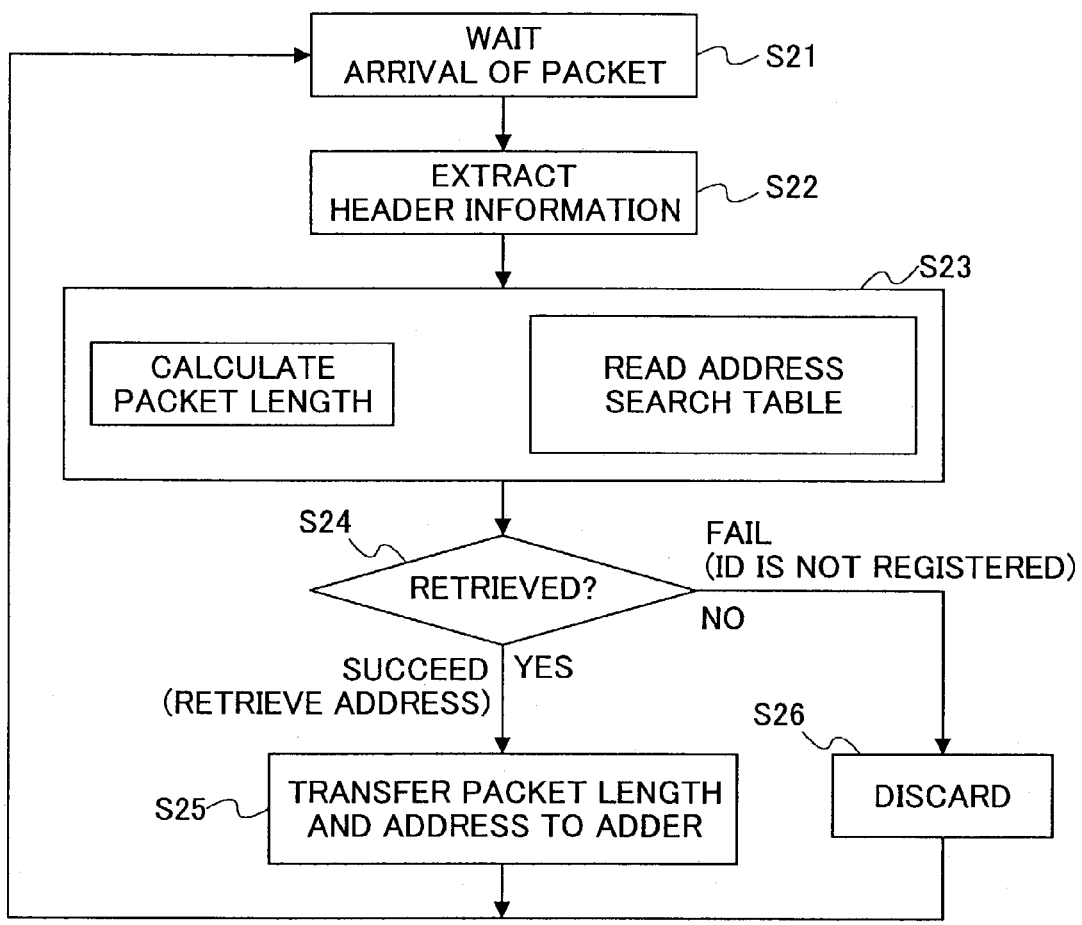
FIG. 12 is a figure for explaining the operation of the packet length extraction part 84.

The operation of the packet length extraction part 84 will be described with reference to FIG. 12.

The packet length extraction part 84 is in a packet waiting state in step S21. When the packet length extraction part 84 receives the packet, the packet length extraction part 84 extracts the header information of the packet 96 in step S22. More specifically, the packet length extraction part 84 extracts the header information for specifying a packet-flow transmitted by a specific application. The header information includes a destination IP address, a source IP address, a protocol type (type of TCP/UDP), a destination port number and a source port number of TCP (Transmission Control Protocol) or UDP (User Datagram Protocol). The header information including the series of data is called "flow ID".

The packet length extraction part 84 obtains the packet length. In addition, the packet length extraction part 84 requests an address corresponding to the flow ID in the accumulated value storing memory 15 from the address search table 86 by using the extracted flow ID in step S23.

When the address is successfully retrieved (in this case, an address other than 0 is returned) (YES in step S24), the packet length extraction part 84 outputs the packet length 97 and the address 98 to the adder 87 in step S25. When the search fails to find the address, (in this case, an address 0 is returned) (NO in step S24), the packet length extraction part 84 discards the packet in step S26, and returns to the operation of waiting for a packet (96) from the replication part 83.

Figure 13:
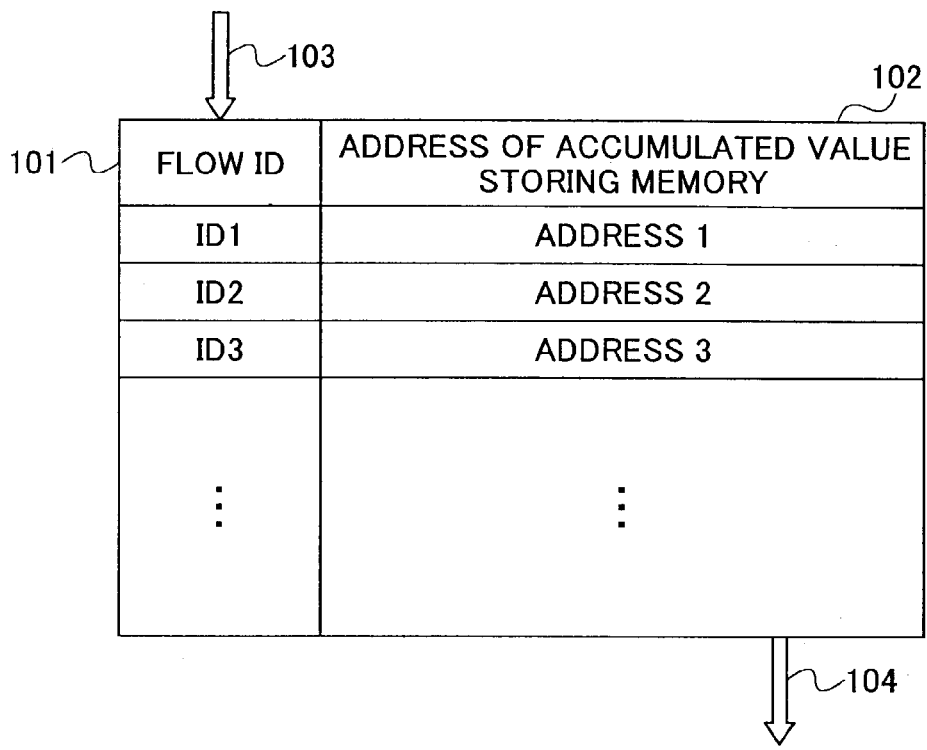
FIG. 13 shows an example of the address search table 86.

FIG. 13 shows an example of the address search table 86. In the figure, 101 indicates a flow ID field, 102 indicates a memory address field for storing the accumulated value, 103 indicates input of the flow ID, and 104 indicates an address in the accumulated value storing memory 85.

In the address search table 86, the flow ID field 101 is searched by using a flow ID 103 obtained by the packet length extraction part 84. If a flow ID the same as the input flow ID 103 exists in the flow ID field 101, the address in the corresponding memory address field 102 is output as an address 104 for storing the accumulated value in the accumulated value storing memory 85. If it does not exist, a special address value (0) is output as the address 104. The stored values in the flow ID field 101 and the accumulated value storing memory address field 102 can be changed as necessary via the interface circuit 90 by the MPU 91.

In FIG. 11, the adder 87 reads data in the address in the accumulated value storing memory 85 on the basis of the address 98 transferred from the packet length extraction part 84.

Figure 14:
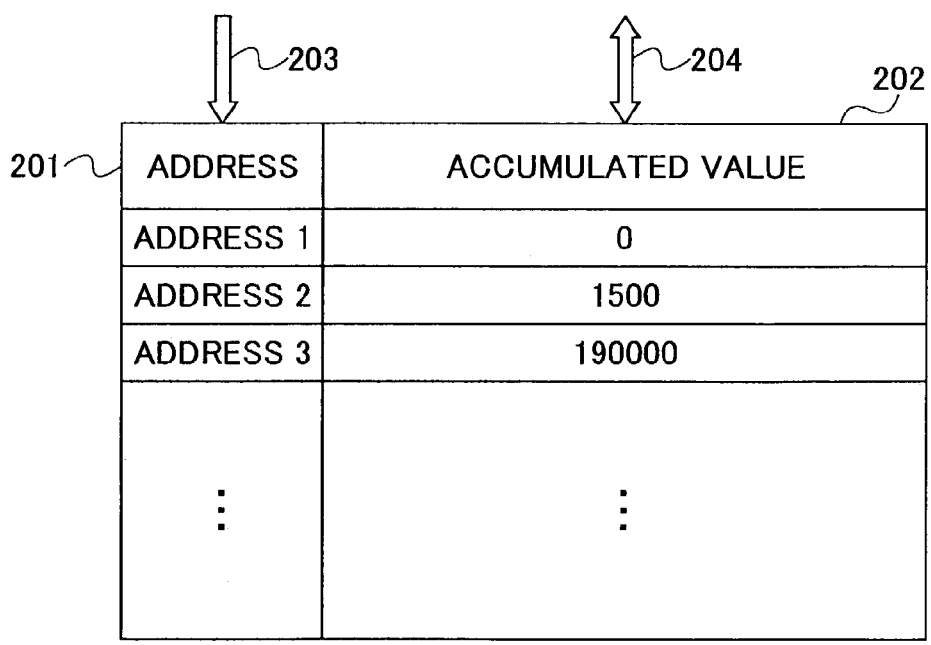
FIG. 14 shows an example of the accumulated value storing memory 85.

FIG. 14 shows an example of the accumulated value storing memory 85. The memory 85 has the same configuration as a general memory. In the figure, 201 indicates an address field, 202 indicates a data field (that stores the accumulated value), 203 indicates input of an address, 204 indicates input and output of data.

The addresses are defined as successive integers. In a reading operation, data stored in a field 202 corresponding to an address 201 input through 203 are output as the data 204. In a writing operation, data 204 are stored in a field 202 corresponding to a specified address 201.

The adder 87 reads data stored in the accumulated value storing memory 85, adds the packet length 97 to the data, and stores the data again in the accumulated value storing memory 85. At this time, the address used for reading and writing is given from the packet length extraction part 84.

The initializing value register 88 stores an initialization value used for initializing the field 202 in the accumulated value storing memory 85. "0" is set as the initialization value in this embodiment. The timing for the initialization will be described later.

The access arbitration circuit 89 arbitrates between accesses to the accumulated value storing memory 85 by each the adder 87 and the interface circuit 90. When initializing the accumulated value storing memory 85, a value stored in the initializing value register 88 is set in a specified address.

The processes so far are performed each time a packet having header information registered in the address search table 86 arrives. Accordingly, the packet length of the received packet is added to the already accumulated value stored in the corresponding data field in the accumulated value storing memory 85.

The interface circuit 90 realizes access to the address search table 86 and the access arbitration circuit 89. The interface circuit 90 mediates accesses to the accumulated value storing memory 85 and the address search table 86 according to the program that is stored in the main memory 92 and processed by the MPU 91.

Figure 15:
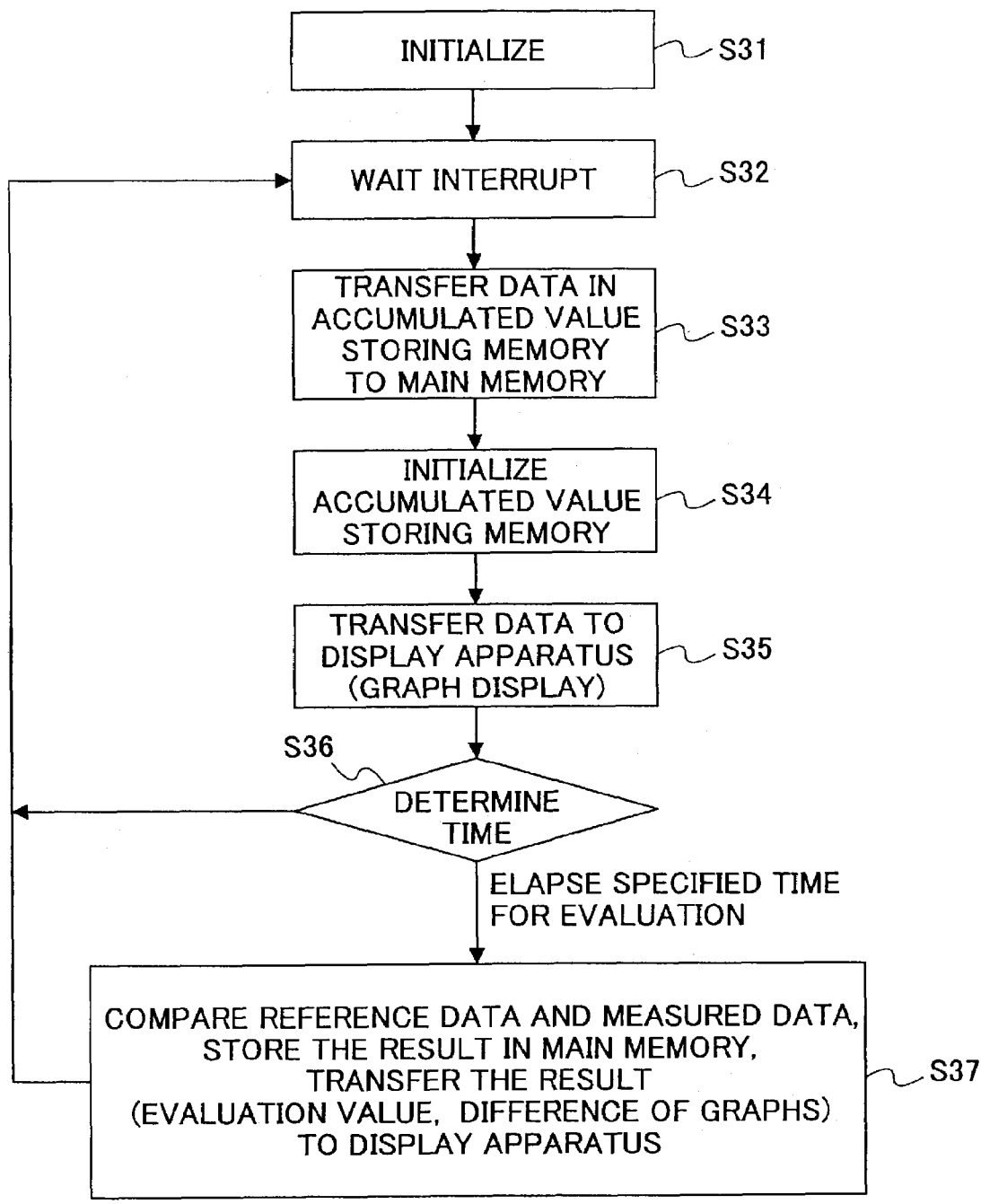
FIG. 15 is a flowchart showing processes performed by a program stored in the main memory.

The operation hereafter will be described with reference to FIG. 15. The processes hereafter are executed according to instructions of the program stored in the main memory 22.

At the time of initialization, in step S31 the program registers header information of a target packet for measurement in the address search table 86. Next, the program sets a value of the initializing value register 88 in all data fields of the accumulated value storing memory 85. In addition, the program sets the real time interrupt generation apparatus 94 so as to generate an interrupt for the MPU 91 at regular intervals in order to realize reading the accumulated value storing memory 85 at regular intervals.

The program waits until the real time interrupt generation device 94 outputs an interrupt signal for the MPU 91 in step S32. At the time when the real time interrupt generation apparatus 94 outputs the interrupt signal, the operation of the program moves from a waiting state to a state reading the data field of the accumulated value storing memory 85.

At this time, the program reads accumulated values in the data fields 202 corresponding to addresses of the memory address fields 102. Each of the addresses corresponds to an address registered in the address search table 86. Then, the program stores the accumulated values in each specified area in the main memory 92 in step S33. The value of the initializing value register 88 is written to the read field 202 successively so as to initialize the field 202 in step S34.

In the accumulated values stored in the main memory 92, an accumulated value that is specified as a display object by the program is transferred to the display apparatus 95, and the display apparatus 95 displays the accumulated value in step S35.

By repeating the above-mentioned processes, a total packet length (accumulated value) within a constant time period can be obtained regularly for a packet-flow of a specific application, in which the constant time period is registered in the real time interrupt generation apparatus 94 as an interrupt generation interval. By plotting the values read from the accumulated value storing memory 85 on a graph in which the horizontal axis indicates time and the vertical axis indicates value, detailed traffic-behavior of the packet-flow can be obtained.

Further, the comparing process described with reference to FIGS. 8 and 9 is performed at greater intervals than the interval used for reading the accumulated value storing memory 85. That is, the time interval is determined in step S36. When a time interval (specified time for evaluation) elapses, the comparison process is performed in step S37.

In the comparison process, the throughput of the burst transfer part and the burst transfer interval time are obtained. Then, the obtained values are plotted on a two-dimensional plane in which the vertical axis indicates the throughput and the horizontal axis indicates the burst transfer interval time, so that the characteristic graph (evaluation plane) after transmission over the network is obtained as shown in FIG. 9. In addition, reference data are stored in the secondary storage 23 beforehand, in which the reference data are similar to the accumulated values obtained by the traffic quality measurement apparatus in an ideal network state before transmission over the network. Then, the evaluation plane is also generated for the reference data, that is, the data are plotted in a graph in which the vertical axis indicates the throughput and the horizontal axis indicates the burst transfer interval time. The graphs may be displayed on the display apparatus 95, or the differences may be displayed. Accordingly, the network performance can be measured.

The comparison can be also performed by comparing traffic-behavior indicated by the measured result and the reference data, in which the traffic-behavior is indicated as a graph in which the horizontal axis indicates time and the vertical axis indicates the accumulated value.

In the following, comparison between the reference data and measurement data will be described in detail.

The reference data is, for example, a periodic burst transmission pattern of packets. The pattern can be observed in a data stream transmitted by a streaming service application that distributes real-time moving images and sound and the like over a network. For example, as for an application that delivers moving images by the NTSC television signal, if a transmission process is performed per each screen, one screen is transmitted about every 33 milliseconds. Assuming that the amount of the data of one screen is 1 Mbyte, a burst of 1 Mbyte occurs every 33 milliseconds. Assuming that the capacity of the network is 1 Gbps and the computer that executes the application has transmission capability of 1 Gbps, a burst having a data rate of 1 Gbps and continuing 8 milliseconds occurs every 30 milliseconds. The reference data show the repetition of this burst. Although the reference data differ for each application, the repeating pattern is common assuming that the capacity of the network line is the same for each application.

When the burst pattern is delivered over the network, burst interval time and burst duration time at the exit of the network (measured data) are different from those at the entrance of the network according to the, status of buffers of lines and node apparatuses that form the network.

For comparing the reference data and measurement data, difference of the two repeating patterns may be obtained. For example, a graph indicating time variation of the difference is generated and displayed. If the difference is large, it indicates that influence exerted on burst characteristics by the network is large. If the difference is small, it indicates that influence exerted on the burst characteristics by the network is small.

In addition, a burst pattern of a specific packet-flow can be generated by a commercial generator, and the generated pattern can be used as the reference data instead of the above-mentioned reference data obtained by measuring a packet-flow at the entrance of a network, for example. In this case, by comparing the reference data generated by the generator and the actual measured data, the influence exerted on the packet-flow by the network can be obtained indirectly. By storing the measured result in a nonvolatile storage, the traffic quality measurement apparatus can be also configured such that post-analysis can be performed.

In the following, an example of traffic measurement using the traffic quality measurement apparatus of the present invention will be described emphasizing differences from a conventional apparatus.

Figure 16:
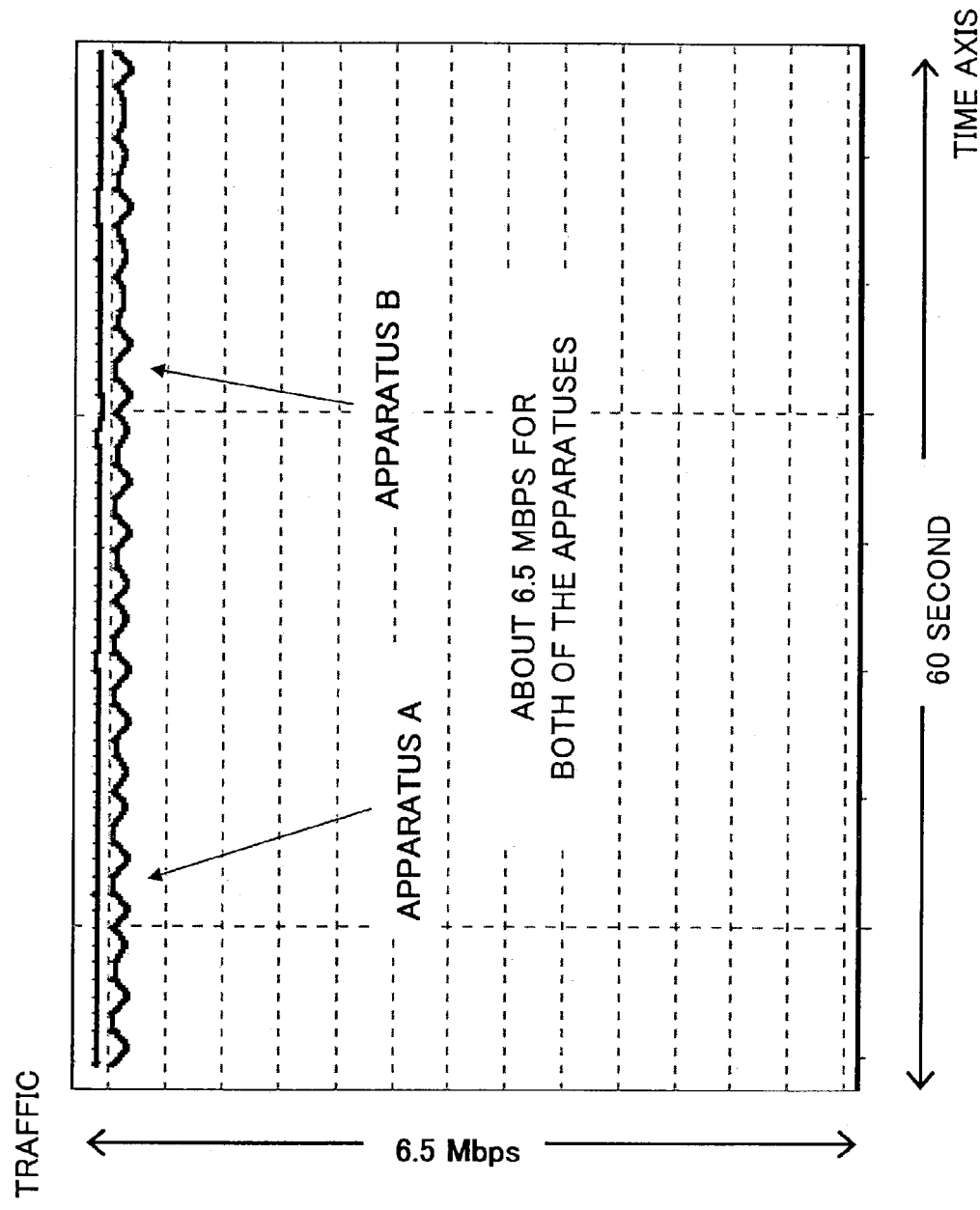
FIG. 16 shows traffic-behavior measured by a conventional apparatus.
Figure 17:
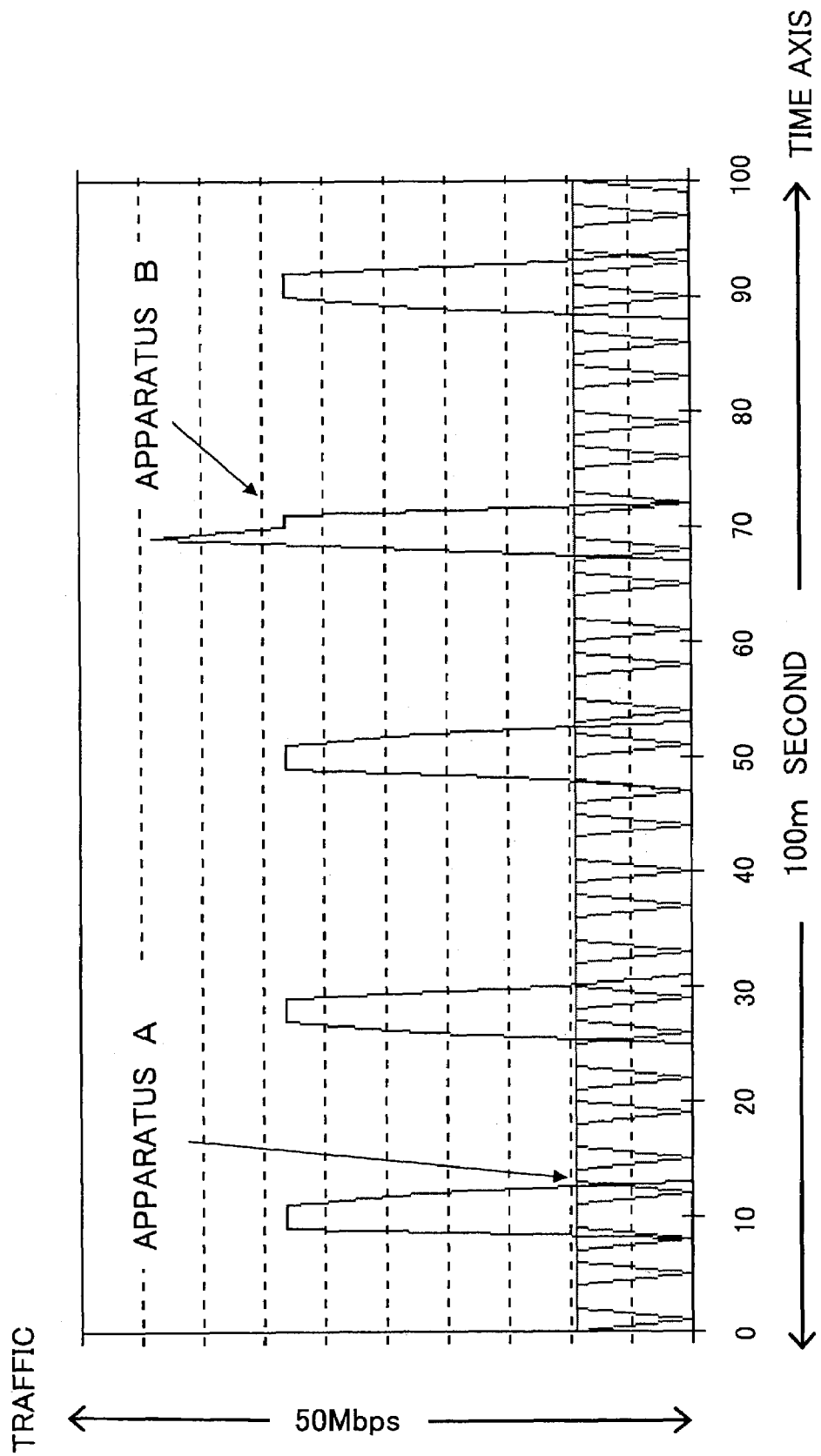
FIG. 17 shows traffic-behavior measured by the traffic quality measurement apparatus of the present invention.

FIGS. 16 and 17 shows examples of measurement results of traffic of packets transmitted by streaming systems (apparatus A and apparatus B) based on MPEG 2, in which traffic characteristics are different between the apparatus A and apparatus B. FIG. 16 shows a result measured by a conventional apparatus. FIG. 17 shows a result measured by the traffic quality measurement apparatus of the present invention.

As shown in FIG. 16, the traffic characteristics for the apparatuses A and B appear to be almost the same. On the other hand, as shown in FIG. 17, the apparatus A generates a traffic pattern that stably changes in which the maximum traffic is 10 Mbps. On the other hand, as for the apparatus B, it can be seen that bursts that exceed 30 Mbps are generated at intervals of 20 milliseconds.

Figure 18:
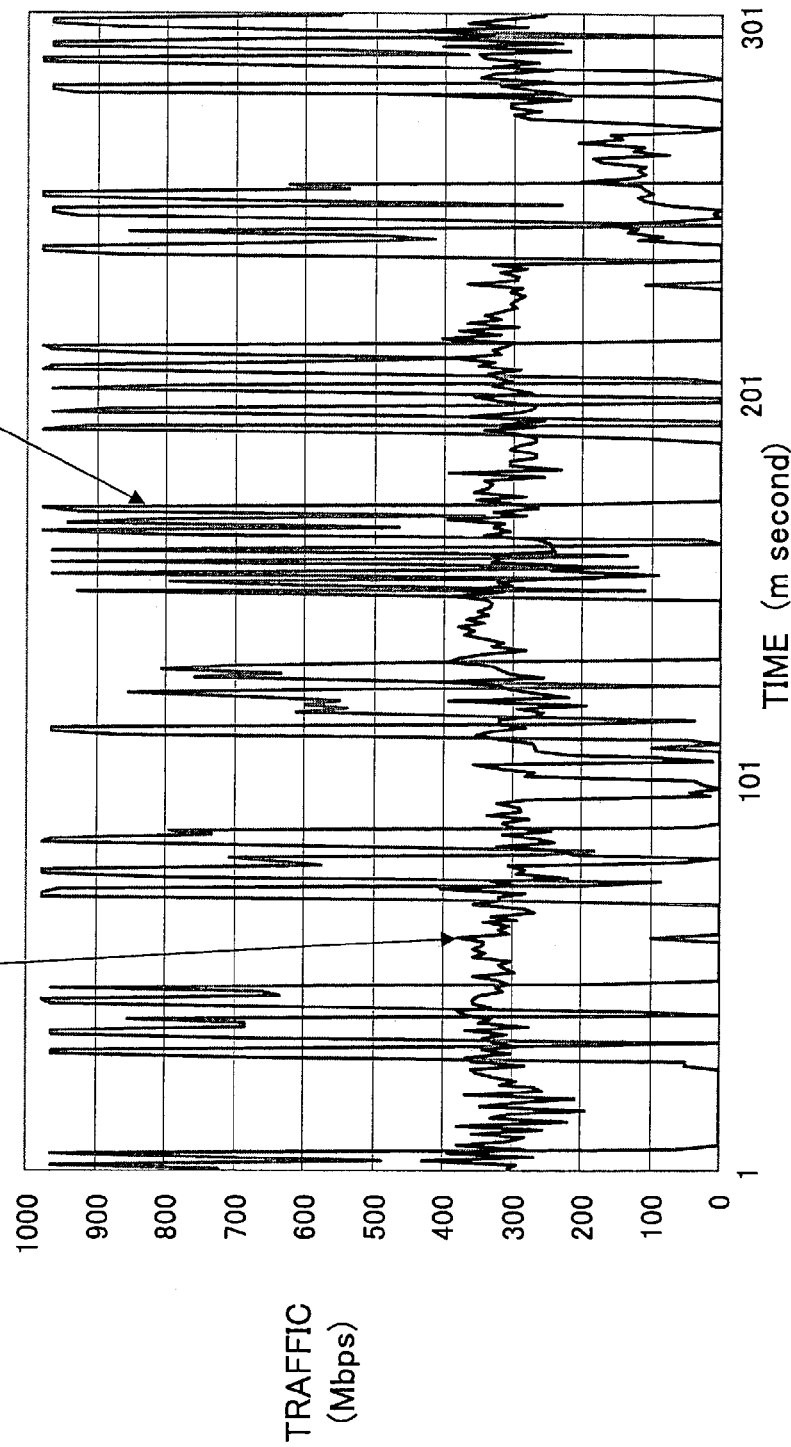
FIG. 18 shows an example in which adjustment of streaming distribution is performed in a streaming distribution application by using the traffic quality measurement apparatus of the present invention.

FIG. 18 shows an example in which adjustment of streaming distribution is performed in a streaming distribution application by using the traffic quality measurement apparatus of the present invention. That is, before adjustment, the streaming distribution application has traffic characteristics in which a burst exceeding 800 Mbps repeats as shown in FIG. 18 indicated as "traffic that cannot be distributed". When this traffic is actually transferred over the network, packet loss occurs. Thus, distribution adjustment is performed such that a traffic pattern indicated as "traffic that can be distributed" shown in FIG. 18 is obtained. When this traffic is transferred over the network, packet loss does not occur and the distribution succeeds. The above-mentioned adjustment can be performed by using the traffic quality measurement apparatus of the present invention that can measure the traffic at short intervals.

As described above, according to the present invention, traffic can be measured with high time-resolution and in real time. In addition, influences exerted on a packet-flow can be measured in detail, in which the packet-flow is transmitted by a specific application executed in a server and a client connected to a network. Therefore, quality management of a streaming service and the above-mentioned distribution adjustment become possible.

The present invention is not limited to the specifically disclosed embodiments, and variations and modifications may be made without departing from the scope of the present invention.

What is claimed is:

1. A measurement apparatus for measuring traffic of packets transmitted over a network, the measurement apparatus comprising:
    an accumulation part for accumulating packet lengths of packets having predetermined header information in successively received packets, and storing an accumulated value of the packet lengths in a storage;
    a periodic reading part for reading the accumulated value from the storage at predetermined time intervals; and
    an outputting part for outputting the accumulated value to an external of the measurement apparatus,
    wherein, by using the accumulated values, the measurement apparatus calculates mean values of traffic volume per a unit time for burst-transfer parts in the packets transmitted over the network and calculates burst-transfer interval times so as to obtain burst characteristics of a packet-flow.

2. The measurement apparatus as claimed in claim 1, wherein the measurement apparatus initializes an area storing the accumulated value in the storage every time the accumulated value is read from the storage.

3. The measurement apparatus as claimed in claim 2, the measurement apparatus further comprising a real-time interrupt part;
    wherein the measurement apparatus starts the operation to read the accumulated value and to initialize the area when the real-time interrupt part outputs an interrupt signal.

4. The measurement apparatus as claimed in claim 1, wherein the time interval is no more than one second.

5. The measurement apparatus as claimed in claim 1, wherein the accumulation part extracts header information of a received packet, obtains an address in the storage corresponding to the header information from a table including the address associated with the header information, and stores the accumulated value in an area corresponding to the address.

6. The measurement apparatus as claimed in claim 1, wherein the outputting part comprises a display part for displaying the accumulated value or a value obtained by processing the accumulated value.

7. The measurement apparatus as claimed in claim 1, wherein the outputting part comprises a sending part for sending the accumulated value or a value obtained by processing the accumulated value to another apparatus over the network.

8. The measurement apparatus as claimed in claim 1, the measurement apparatus further comprising:
    a reference data storing part for storing reference data beforehand; and
    a reference data comparing part for comparing the reference data with a measurement result obtained by the measurement apparatus.

9. The measurement apparatus as claimed in claim 8, wherein the reference data comparing part obtains differences between the measurement result and the reference data.

10. A measurement method used in a measurement apparatus for measuring traffic of packets transmitted over a network, the measurement method comprising the steps of:
    accumulating packet lengths of packets having predetermined header information in successively received packets, and storing an accumulated value of the packet lengths in a storage;
    reading the accumulated value from the storage at predetermined time intervals;
    by using the accumulated values, calculating mean values of traffic volume per a unit time for burst-transfer parts in the packets transmitted over the network and calculating burst-transfer interval times so as to obtain burst characteristics of a packet-flow; and
    outputting the accumulated value to an external of the measurement apparatus.

11. The measurement method as claimed in claim 10, the measurement method further comprising the step of initializing an area storing the accumulated value in the storage every time the accumulated value is read from the storage.

12. The measurement method as claimed in claim 11, the measurement apparatus comprising a real-time interrupt part; and
    the measurement method comprising the step of starting the operation to read the accumulated value and to initialize the area when the real-time interrupt part outputs an interrupt signal.

13. The measurement method as claimed in claim 10, wherein the time interval is no more than one second.

14. The measurement method as claimed in claim 10, wherein, in the step of storing the accumulated value in the storage, the measurement apparatus extracts header information of a received packet, obtains an address in the storage corresponding to the header information from a table including the address associated with the header information, and stores the accumulated value in an area corresponding to the address.

15. The measurement method as claimed in claim 10, wherein the outputting step comprises the step of displaying the accumulated value or a value obtained by processing the accumulated value.

16. The measurement method as claimed in claim 10, wherein the outputting step comprises the step of sending the accumulated value or a value obtained by processing the accumulated value to another apparatus over the network.

17. The measurement method as claimed in claim 10, the measurement method further comprising the step of comparing reference data with a measurement result obtained by the measurement apparatus.

18. The measurement-method as claimed in claim 17, wherein the measurement apparatus obtains differences between the measurement result and the reference data in the step of comparing.

* * * * *